March 13, 1962 T. R. NISBET 3,024,695
LIGHT INTENSITY METER
Filed Dec. 10, 1959 2 Sheets-Sheet 1
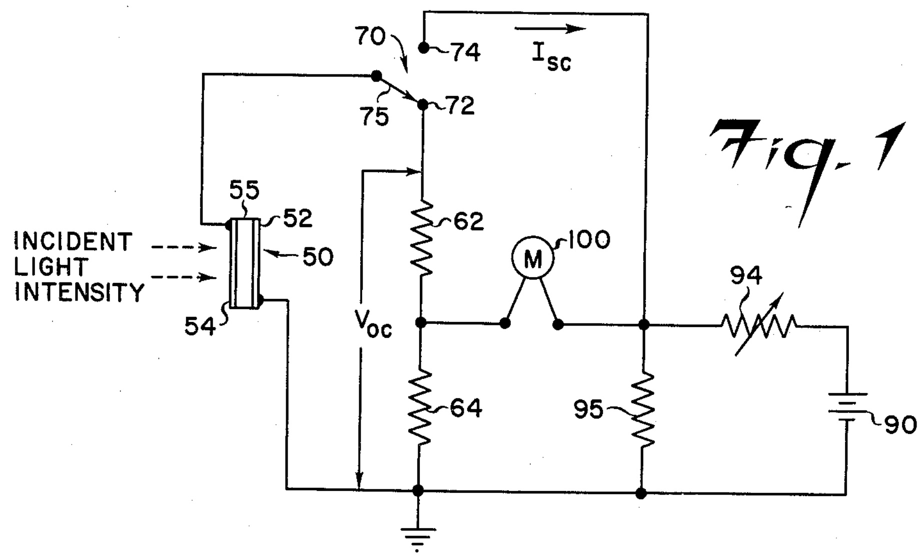
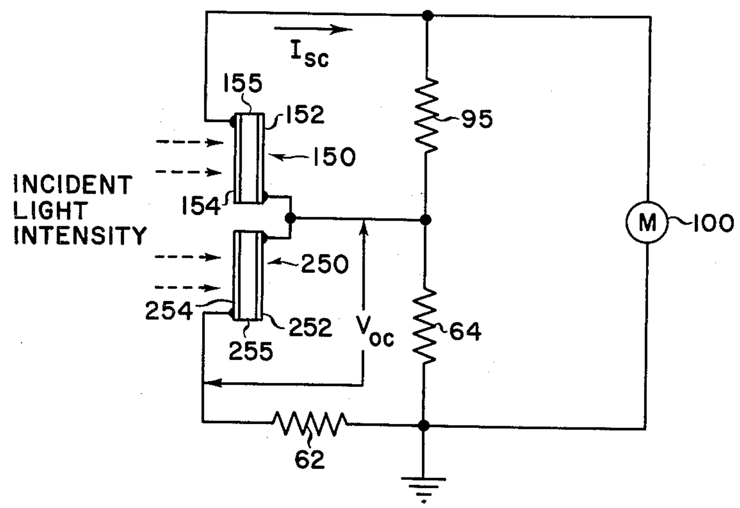
INVENTOR.
THOMAS R. NISBET
BY George C. Sullivan
Agent INVENTOR.
THOMAS R. NISBET
BY George C. Sullivan
Agent 3,024,695
Patented Mar. 13, 1962

3,024,695

LIGHT INTENSITY METER

Thomas R. Nisbet, Palo Alto, Calif., assignor to Lockheed Aircraft Corporation, Burbank, Calif.

Filed Dec. 10, 1959, Ser. No. 858,753
7 Claims. (Cl. 88—23)

This invention relates generally to light-responsive devices, and more particularly to a light intensity device which can be operated over a very wide temperature range.

One of the problems which has developed in the measurement of light intensity, particularly where high light intensities are involved, is the difficulty of obtaining an accurate measurement because of the effect of temperature variations on the output of the light-responsive element. This problem is most prominent when high light intensities are to be measured, because the high light intensity itself heats up the element causing it to vary its output reading. For this reason, it has been necessary to provide relatively complicated temperature compensating networks or environmental temperature control in order to accurately measure high light intensities. However, even these compensating techniques have heretofore not been entirely satisfactory in permitting the operation of a light intensity meter over any wide temperature range when it is subjected to high light intensities which cause heating of the light-responsive element.

Accordingly, it is the broad object of this invention to provide an improved light intensity device.

A more specific object of this invention is to provide a light intensity device which is capable of accurately providing a measurement of high light intensities over a wide temperature range.

Another object of this invention is to provide a light intensity device in accordance with the above mentioned objects which is very simple and can be made in compact form at low cost.

The basic feature of this invention resides in the discovery that the variations in the short circuit current and the open circuit voltage of a photovoltaic semiconductor cell may be combined in such a way that an output reading proportional to the incident light intensity can be obtained, which is almost perfectly compensated over a very wide temperature range. The specific nature of the invention, as well as other objects, uses and advantages thereof, will clearly appear from the following description and from the accompanying drawing in which:

FIGURE 1 is a circuit and schematic diagram of an embodiment of a light intensity device in accordance with the invention.

FIGURE 2 is an alternate embodiment of a light intensity device in accordance with the invention in which the output reading is obtained automatically.

Figure 3:
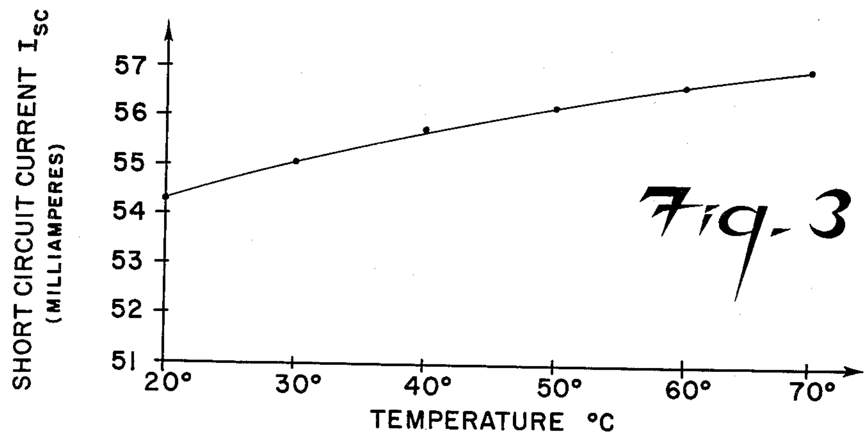
FIGURE 3 is a graph showing how the short circuit current $I_{sc}$ of a typical silicon solar cell varies with changes in temperature.

In FIGURE 1 a typical silicon solar cell 50 is used as the photovoltaic semiconductor cell. Such silicon solar cells are commercially available in a variety of forms. The silicon solar cell 50 has electrodes 52 and 54 on opposite faces of the silicon body 55 of the molar cell 50 in a conventional manner.

A single pole double-throw switch 70, having a movable arm 75 and two switch contacts 72 and 74, is connected in series with the electrode 54 of the solar cell 50, the other electrode 52 of the solar cell 50 being connected to circuit ground. When the movable arm 75 of the switch 70 is at contact 72, as shown in FIGURE 1, the series connected resistors 62 and 64 are connected across the solar cell 50, while when the movable arm 75 of the switch 70 is at contact 74, only the resistor 95 is connected across the solar cell 50.

The sum of the resistors 62 and 64 is chosen sufficiently large so that they effectively appear as an open circuit to the solar cell 50. Thus, when the switch 70 has its movable arm 75 at contact 72, the open circuit voltage $V_{oc}$ of the solar cell 50 will appear across the resistors 62 and 64 as indicated in FIGURE 1. On the other hand, the resistor 95, which is connected directly across the solar cell 50 when the movable arm 75 of the switch 70 is at contact 74, is chosen to have a very small value so that it effectively appears as a short circuit to the solar cell 50. A short circuit current $I_{sc}$ will then flow to the resistor 95 when the switch is at contact 74 as shown in FIGURE 1.

Also, in FIGURE 1, a relatively high impedance voltmeter 100 is connected between the junction of the resistors 62 and 64 and the contact 74 of the switch 70; and further, a battery 90 and a variable resistor 94 in series therewith is connected across the resistor 95.

Figure 4:
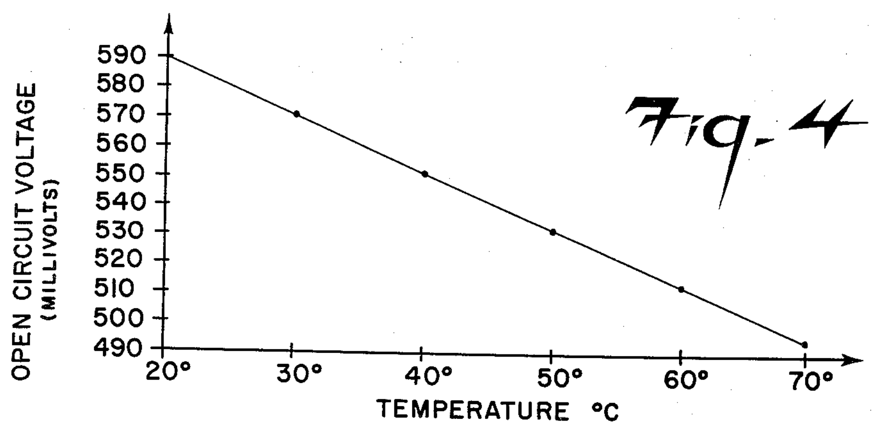
FIGURE 4 is a graph showing how the open circuit voltage $V_{oc}$ of a typical silicon solar cell varies with changes in temperature.

By means of the circuit shown in FIGURE 1, it is possible to obtain a measurement of light intensity which will remain substantially constant, even in the presence of large temperature variations. I have discovered that this can be accomplished by properly combining the open circuit $V_{oc}$ and the short circuit current $I_{sc}$ of a silicon solar cell in such a way that temperature compensation is obtained. FIGURES 3 and 4 illustrate how variations in temperature affect the short circuit current $I_{sc}$ and the open circuit voltage $V_{oc}$ of a typical silicon solar cell. It can be seen that the short circuit current $I_{sc}$ rises substantially linearly as temperature increases, while the open circuit voltage $V_{oc}$ falls substantially linearly as temperature increases. By combining a proper portion of the open circuit voltage $V_{oc}$ and the short circuit current $I_{sc}$, therefore, it is possible to obtain a resultant light intensity reading which remains substantially constant with variations in temperature. There are many well known expedients for combining the variations in a voltage and a current, all necessarily requiring converting one or both to a phenomenon which is compatible with the other. For example, transducers are available for converting voltage and current to pneumatic or hydraulic pressure. By combining the output of such transducers in any suitable pressure responsive device a measurement independent of temperature variations is obtained. However, I prefer to convert the short circuit current (a phenomenon incompatible with voltage) to a voltage which may be additively combined with a portion of the open circuit voltage so as to yield a voltage which is independent of temperature variations.

To this end, the resistor 62 in FIGURE 1 is chosen with respect to the resistor 64 so that when the switch 70 is at contact 72, a predetermined proportion of the open circuit voltage $V_{oc}$ appears across the resistor 64. By adjusting the value of the adjustable resistor 94 and observing when the meter 100 indicates a null, the voltage across the resistor 95 may be set to a value equal to the predetermined proportion of the open circuit voltage $V_{oc}$ appearing across the resistor 64. The movable arm 75 of the switch 70 is now switched to contact 74, which causes the short circuit current $I_{sc}$ to flow to the resistor 95. Thus, the voltage produced by the short circuit current $I_{sc}$ flowing through the resistor 95 produces a second predetermined voltage which adds to the voltage set across the resistor 95 when the switch 70 was at contact 72, thereby producing a resultant voltage across the resistor 95 which is the sum of a predetermined portion of the open circuit voltage $V_{oc}$ and a voltage proportional to a predetermined portion of the short circuit current $I_{sc}$. The values of the resistors, 62, 64 and 95, are chosen so that the combination of these two voltages produces a resultant voltage across the resistor 95 which remains substantially constant with variations in temperature.

Figure 5:
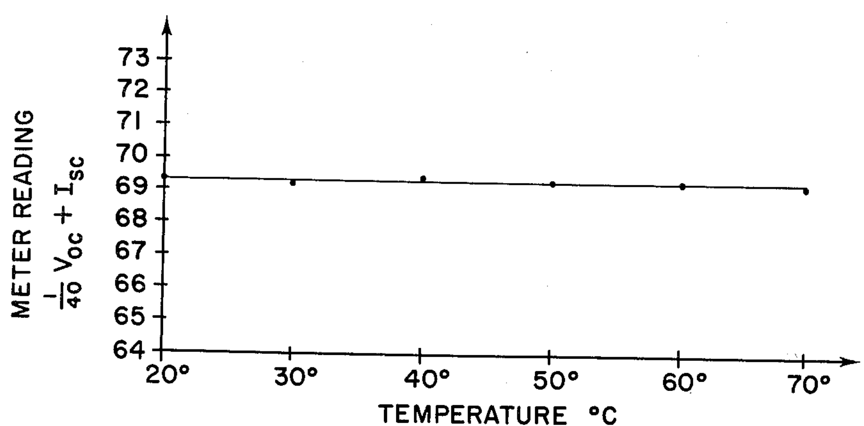
FIGURE 5 is a graph showing the temperature compensation which can be obtained when the short circuit $I_{sc}$ and the open circuit voltage $V_{oc}$ are properly combined, in accordance with the invention.

The choice of the proper values of the resistors 62, 64 and 95 in FIGURE 1 may be illustrated for a typical silicon solar cell 50, having a short circuit current $I_{sc}$ and an open circuit voltage $V_{oc}$ which vary with temperature as illustrated in FIGURES 3 and 4. For such a typical silicon solar cell, it will be seen that over the range of temperature shown, the open circuit voltage $V_{oc}$ falls at approximately 2 millivolts per degree centigrade, while the short circuit current $I_{sc}$ rises at a rate of approximately .05 milliampere per degree centigrade. Thus, it will be understood that if one-fortieth of the open circuit voltage $V_{oc}$ in millivolts is added to a voltage in millivolts equal to the value of the short circuit current $I_{sc}$ in milliamperes, the resultant summation will remain substantially constant over the entire temperature range shown, as illustrated in FIGURE 5.

Once it is realized that one-fortieth of the open circuit voltage $V_{oc}$ in millivolts must be added to a voltage in millivolts equal to the short circuit current $I_{sc}$ in milliamperes in order to obtain temperature compensation, the resistance values 62, 64 and 95 in FIGURE 1 can be chosen accordingly. Typical values which may be used are as follows: resistor 62—39,000 ohms; resistor 64—1,000 ohms; and resistor 95—1 ohm. The total 40,000 ohms series resistance of resistors 62 and 64 is clearly sufficient to serve as an open circuit for the solar cell 50. Also, the 1 ohm resistance of resistor 95 is clearly small enough to effectively short circuit the solar cell 50.

With these values for resistors 62, 64 and 95, the operation of the circuit of FIGURE 1 will now be more specifically described. The movable arm 75 of the switch 70 is initially placed at contact 72 as before. Since the value of the resistor 64 is 1,000 ohms and the value of the resistor 62 is 39,000 ohms, one-fortieth of the open circuit voltage $V_{oc}$ appears across the resistor 64. The variable resistor 94 is then adjusted so that the same one-fortieth of the open circuit voltage also appears across the resistor 95 as indicated by a null of the meter 100.

The movable arm 75 of the switch 70 is now switched to the contact 74, causing the short circuit current $I_{sc}$ to flow to the resistor 95. Since the resistor 95 has a value of one ohm, the additional voltage developed across this resistor 95 due to $I_{sc}$ will be equal thereto. The resultant voltage across the resistor 95, therefore, when the switch 70 is at contact 74 will be a value equal to one-fortieth of the open circuit voltage $V_{oc}$ plus a voltage equal to the short circuit current $I_{sc}$. As was previously described, such a combination of the open circuit voltage $V_{oc}$ and the short circuit current $I_{sc}$ produces a resultant voltage across the resistor 95 which will remain substantially constant with variations in temperature as shown in FIGURE 5. This voltage across the resistor 95 is a measure of the light intensity incident on the solar cell.

Although the circuit of FIGURE 1 is adequate and will give a resultant measurement of light intensity which is independent of temperature variations, it is somewhat inconvenient to use in that an initial adjustment must first be made for each light intensity to be measured before the final reading can be obtained. Also, the circuit of FIGURE 1 requires continuing attention in that it would be necessary to readjust the initial setting across the resistor 95 in the event of a temperature change. To overcome these inconveniences, the more practical circuit shown in FIGURE 2 has been developed. In this circuit of FIGURE 2, two silicon solar cells 150 and 250 are employed to permit the resulting compensation to be obtained continuously without the need for any manual adjustments, thereby making it ideally suited for the continuous recording of light intensity.

In FIGURE 2, similarly designated elements correspond to like elements in FIGURE 1. The electrodes 152 and 154 and the body 155 of the solar cell 150, and the electrodes 252 and 254 and the body 255 of the solar cell 250, correspond respectively to the electrodes 52 and 54 and the solar cell body 55 of the solar cell 50 in FIGURE 1, the numerals being separated by 100 in order to distinguish therebetween.

If we again assume that the curves shown in FIGURES 3 and 4 represent the curves of the short circuit current $I_{sc}$ and the open circuit voltage $V_{oc}$ of each of the substantially identical silicon solar cells 150 and 250, adding one-fortieth of the open circuit voltage $V_{oc}$ in millivolts to a voltage in millivolts equal to the short circuit current $I_{sc}$ in milliamperes will produce a resultant sum which will remain substantially constant with variations in temperature, as was described previously in connection with the circuit of FIGURE 1. It is to be understood that it is not necessary that the solar cells 150 and 250 be identical, it being sufficient that the solar cell which is short-circuited have a short circuit current $I_{sc}$ which varies with temperature in inverse relation to the variations in temperature of the open circuit voltage $V_{oc}$ of the other solar cell which is open-circuited, thereby permitting appropriate portions of $I_{sc}$ and $V_{oc}$ to be combined to provide temperature compensation.

As in FIGURE 1 the resistor 62 has a value equal to 39,000 ohms and the resistor 64 has a value equal to 1,000 ohms. Thus, in FIGURE 2, one-fortieth of the open circuit voltage of the solar cell 250 appears across the resistor 64 at all times. Similarly, the value of the reistor 95 is chosen to be one ohm as in FIGURE 1 so that a voltage appears across it which is at all times equal to the short circuit current $I_{sc}$ of the solar cell 150. Consequently, a meter such as 100 in FIGURE 1 connected across the resistors 95 and 64 will continuously read the sum of one-fortieth of the open circuit voltage $V_{oc}$ plus a voltage equal to the short circuit current $I_{sc}$ in the presence of light intensity or temperature variations, without the need for any manual setting or adjustment by the operator. Such a circuit used in a light intensity meter, therefore, will instantly provide a reading over a wide temperature range of the light intensity incident on the solar cells 150 and 250, regardless of how much the solar cells are heated due to the incident light intensity. The meter 100 can be calibrated in any convenient units of light intensity.

It is to be understood that various modifications can be made in the construction and arrangement of the embodiments shown in the drawing, without departing from the scope of this invention. For example, other photovoltaic semiconductor cells could be used instead of the silicon solar cells exemplified. Also, various circuit variations will be evident to those skilled in the art. It is to be realized, therefore, that the embodiment shown and the specific values given are in no way intended to limit the scope of the invention. The invention is to be considered as including all possible modifications in construction and arrangement within the scope of the invention as defined in the appended claims.

I claim as my invention:

1. A device for measuring light intensity which is unaffected by variations in temperature comprising: at least one photovoltaic semiconductor cell upon which the light intensity to be measured is incident, circuit means in which said cell is incorporated for additively combining voltages corresponding to predetermined portions of the short circuit current $I_{sc}$ and the open circuit voltage $V_{oc}$ of at least one cell so that a resultant electrical signal is obtained which remains substantially constant with variations in temperature, said circuit means including means for producing a voltage corresponding to said short circuit current $I_{sc}$, and indication means connected to said circuit means for employing said resultant electric signal to provide an indication of the light intensity incident on said cell.

2. A device for measuring light intensity which is unaffected by variations in temperature comprising: a photovoltaic semiconductor cell upon which the light intensity to be measured is incident, circuit means connected to said cell for additively combining voltages corresponding to predetermined portions of the short circuit current $I_{sc}$ and the open circuit voltage $V_{oc}$ of said cell so that a resultant electrical signal is obtained which remains substantially constant with variations in temperature said circuit means including means for producing a voltage corresponding to said short circuit current $I_{sc}$, and indication means connected to said circuit means for employing said resultant electrical signal to provide an indication of the light intensity incident on said cell.

3. A device for measuring light intensity whose measurement remains substantially constant over a wide temperature range, said device comprising: a photovoltaic semiconductor cell upon which the light intensity to be measured is incident, said cell having a short circuit current $I_{sc}$ which varies substantially proportionally with temperature and an open circuit voltage $V_{oc}$ which varies substantially inversely proportionally with temperature, and circuit means connected to said cell for adding voltages corresponding to predetermined portions of $I_{sc}$ and $V_{oc}$ to produce a resultant electrical signal which remains substantially constant with variations in temperature said circuit means including means for producing a voltage corresponding to said short circuit current $I_{sc}$, and indication means connected to said circuit means for employing said resultant electrical signal as the measure of the light intensity incident on said cell.

4. The invention in accordance with claim 3, wherein said photovoltaic semiconductor cell is a silicon solar cell.

5. A device for measuring light intensity whose measurement remains substantially constant over a wide temperature range, said device comprising: first and second photovoltaic semiconductor cells upon which the light intensity to be measured is incident, said first cell having a short circuit current $I_{sc}$ which varies with temperature in substantially inverse relation to the variations in temperature of the open circuit voltage $V_{oc}$ of said second cell, resistance means for effectively short-circuiting said first cell and obtaining a first electrical signal corresponding to the short circuit current $I_{sc}$ thereof, means for effectively open-circuiting said second cell and obtaining a second electrical signal corresponding to the open circuit voltage $V_{oc}$ thereof, circuit means for combining predetermined portions of said first and second electrical signals to produce a resultant electrical signal which remains substantially constant with variations in temperature, and indication means connected to said circuit means for employing said resultant electrical signal as a measure of the light intensity incident on said cell.

6. The invention in accordance with claim 5 wherein said first and second photovoltaic semiconductor cells are silicon solar cells.

7. A device for measuring light intensity whose measurement remains substantially constant over a wide temperature range, said device comprising in combination: first and second substantially identical silicon solar cells upon which the light intensity to be measured is incident, each cell having two electrodes and a short circuit current $I_{sc}$ which varies substantially proportionally with temperature and an open circuit voltage $V_{oc}$ which varies substantially inversely proportionally with temperature, a first resistor connected across the electrodes of said first cell and having a value so that said first cell is effectively short-circuited, second and third resistors in series connected across the electrodes of said second cell and having a series resistance so that said second cell is effectively open-circuited, means connecting one electrode of said first cell to one electrode of said second cell, and a voltage responsive indicator connected across the other electrodes of said cells, said first, second and third resistors being chosen so that the resultant voltage applied to said indicator remains substantially constant with variations in temperature, the output reading of said indicator providing an indication of the light intensity incident.

No references cited.